US010642041B2

(12) United States Patent
Han et al.

(10) Patent No.: US 10,642,041 B2
(45) Date of Patent: May 5, 2020

(54) DIRECTION BASED ELECTRONIC DEVICE FOR DISPLAYING OBJECT AND METHOD THEREOF

(71) Applicant: Samsung Electronics Co., Ltd., Gyeonggi-do (KR)

(72) Inventors: Woo Jung Han, Seoul (KR); Seung Hwan Hong, Gyeonggi-do (KR); So Ra Kim, Seoul (KR); Seo Young Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 37 days.

(21) Appl. No.: 14/934,819

(22) Filed: Nov. 6, 2015

(65) Prior Publication Data
US 2016/0132131 A1 May 12, 2016

(30) Foreign Application Priority Data

Nov. 7, 2014 (KR) .......................... 10-2014-0154802

(51) Int. Cl.
*G06F 3/0346* (2013.01)
*G02B 27/01* (2006.01)
*G06F 3/01* (2006.01)

(52) U.S. Cl.
CPC ....... *G02B 27/0172* (2013.01); *G02B 27/017* (2013.01); *G06F 3/011* (2013.01); *G06F 3/012* (2013.01); *G02B 2027/014* (2013.01); *G02B 2027/0187* (2013.01)

(58) Field of Classification Search
None
See application file for complete search history.

(56) References Cited

U.S. PATENT DOCUMENTS

| 5,864,330 A * | 1/1999 | Haynes ............... G06F 3/04855 715/856 |
| 6,757,068 B2 | 6/2004 | Foxlin |
| 7,301,648 B2 | 11/2007 | Foxlin |
| 8,643,951 B1 | 2/2014 | Wheeler et al. |

(Continued)

FOREIGN PATENT DOCUMENTS

| CN | 104007815 | 8/2014 |
| CN | 104115100 | 10/2014 |

(Continued)

OTHER PUBLICATIONS

International Search Report dated Mar. 3, 2016 issued in counterpart application No. PCT/KR2015/011894, 13 pages.

(Continued)

*Primary Examiner* — Patrick N Edouard
*Assistant Examiner* — Peijie Shen
(74) *Attorney, Agent, or Firm* — The Farrell Law Firm, P.C.

(57) ABSTRACT

An electronic device is provided. The electronic device includes a processor configured to implement an execution screen area which is larger than a size of a display of the electronic device and comprises at least one object, and a display module configured to display, on a display of the electronic device, a display area which is at least a part of the implemented execution screen area. The processor determines a location of the at least one object based on a direction to which the electronic device faces and an attribute of the at least one object.

16 Claims, 13 Drawing Sheets

(56) References Cited

U.S. PATENT DOCUMENTS

| | | | |
|---|---|---|---|
| 8,692,739 B2 | 4/2014 | Mathieu et al. | |
| 8,799,810 B1* | 8/2014 | Wheeler | G06F 3/012 |
| | | | 348/208.99 |
| 8,964,008 B2 | 2/2015 | Bathiche | |
| 9,129,430 B2 | 9/2015 | Salter et al. | |
| 9,329,682 B2* | 5/2016 | Keane | G06F 3/013 |
| 9,406,143 B2 | 8/2016 | Cho et al. | |
| 9,501,873 B2 | 11/2016 | Salter et al. | |
| 9,523,854 B2 | 12/2016 | Kuriya et al. | |
| 9,761,057 B2 | 9/2017 | Salter et al. | |
| 9,857,886 B2 | 1/2018 | Kuriya et al. | |
| 2001/0015718 A1* | 8/2001 | Hinckley | A63F 13/06 |
| | | | 345/156 |
| 2002/0024675 A1 | 2/2002 | Foxlin | |
| 2002/0105482 A1* | 8/2002 | Lemelson | G06F 3/013 |
| | | | 345/7 |
| 2004/0201857 A1 | 10/2004 | Foxlin | |
| 2006/0284792 A1 | 12/2006 | Foxlin | |
| 2007/0296646 A1* | 12/2007 | Yamamoto | G02B 27/017 |
| | | | 345/8 |
| 2009/0271732 A1* | 10/2009 | Kondo | G02B 27/0093 |
| | | | 715/781 |
| 2011/0037712 A1* | 2/2011 | Kim | H04M 1/7253 |
| | | | 345/173 |
| 2012/0320169 A1 | 12/2012 | Bathiche | |
| 2013/0076787 A1 | 3/2013 | Mathieu et al. | |
| 2013/0335301 A1* | 12/2013 | Wong | G02B 27/0093 |
| | | | 345/8 |
| 2014/0168262 A1* | 6/2014 | Forutanpour | G06T 19/006 |
| | | | 345/633 |
| 2014/0191946 A1 | 7/2014 | Cho et al. | |
| 2014/0233798 A1 | 8/2014 | Cho et al. | |
| 2014/0368533 A1* | 12/2014 | Salter | G02B 27/017 |
| | | | 345/619 |
| 2014/0375683 A1* | 12/2014 | Salter | G06F 3/013 |
| | | | 345/633 |
| 2015/0007114 A1* | 1/2015 | Poulos | G06F 3/012 |
| | | | 715/852 |
| 2015/0009132 A1 | 1/2015 | Kuriya et al. | |
| 2015/0070389 A1* | 3/2015 | Goto | G06T 7/00 |
| | | | 345/633 |
| 2015/0199081 A1* | 7/2015 | Wheeler | G06F 3/0482 |
| | | | 715/781 |
| 2015/0205106 A1* | 7/2015 | Norden | G02B 27/01 |
| | | | 345/7 |
| 2015/0317829 A1* | 11/2015 | Carter | G06T 19/006 |
| | | | 345/633 |
| 2015/0325054 A1 | 11/2015 | Salter et al. | |
| 2016/0025981 A1* | 1/2016 | Burns | G02B 27/0093 |
| | | | 345/156 |
| 2016/0063762 A1* | 3/2016 | Heuvel | G06F 3/011 |
| | | | 345/633 |
| 2017/0068336 A1* | 3/2017 | Kuriya | G06F 3/012 |
| 2017/0069143 A1 | 3/2017 | Salter et al. | |
| 2018/0081451 A1 | 3/2018 | Kuriya et al. | |
| 2018/0329662 A1* | 11/2018 | Cronin | G06F 3/14 |

FOREIGN PATENT DOCUMENTS

| | | |
|---|---|---|
| EP | 2 211 224 | 7/2010 |
| KR | 1020090052413 | 5/2009 |
| KR | 1020110070210 | 6/2011 |
| KR | 1020140090552 | 7/2014 |
| WO | WO 2013/121730 | 8/2013 |

OTHER PUBLICATIONS

European Search Report dated Oct. 4, 2017 issued in counterpart application No. 15856240.5-1972, 7 pages.
Chinese Office Action dated Feb. 28, 2019 issued in counterpart application No. 201580066541.7, 17 pages.

\* cited by examiner

DIRECTION BASED ELECTRONIC DEVICE FOR DISPLAYING OBJECT AND METHOD THEREOF

PRIORITY

This application claims priority under 35 U.S.C. § 119(a) to a Korean Patent Application filed on Nov. 7, 2014 in the Korean Intellectual Property Office and assigned Serial No. 10-2014-0154802, the disclosure of which is incorporated herein by reference.

BACKGROUND

1. Field of the Disclosure

The present disclosure generally relates to a direction-based electronic device for displaying an object, and a method thereof.

2. Description of the Related Art

With developments in information and communication technology, network devices such as a base station and the like have been installed throughout the country. Electronic devices receive and transmit data from and to other electronic devices through a network, and thus a user can utilize the network freely anywhere in the country.

Various kinds of the electronic devices provide a variety of functions in accordance with the recent trend of the digital convergence. For example, a smartphone supports Internet connection through the network as well as a call function. Furthermore, the smartphone supports playback of music or video, capturing of video, photo, and the like, using an image sensor, and the like.

SUMMARY

The present disclosure has been made to address at least the above-mentioned problems and/or disadvantages and to provide at least the advantages described below. Accordingly, an aspect of the present disclosure is to provide an electronic device which determines a location of an object at least based on a direction that the electronic device faces, and a method thereof.

In accordance with an aspect of the present disclosure, an electronic device includes a processor configured to implement an execution screen area which is larger than a size of a display of the electronic device and comprises at least one object, and a display module configured to display, on a display of the electronic device, a display area which is at least a part of the implemented execution screen area. The processor determines a location of the at least one object based on a direction to which the electronic device faces and an attribute of the at least one object.

In accordance with another aspect of the present disclosure, a method performed on an electronic device includes implementing an execution screen area which is larger than a size of a display of the electronic device and comprises at least one object, displaying, on a display of the electronic device, a display area which is at least a part of the implemented execution screen area, and determining a location of the at least one object based on a direction to which the electronic device faces and an attribute of the at least one object.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
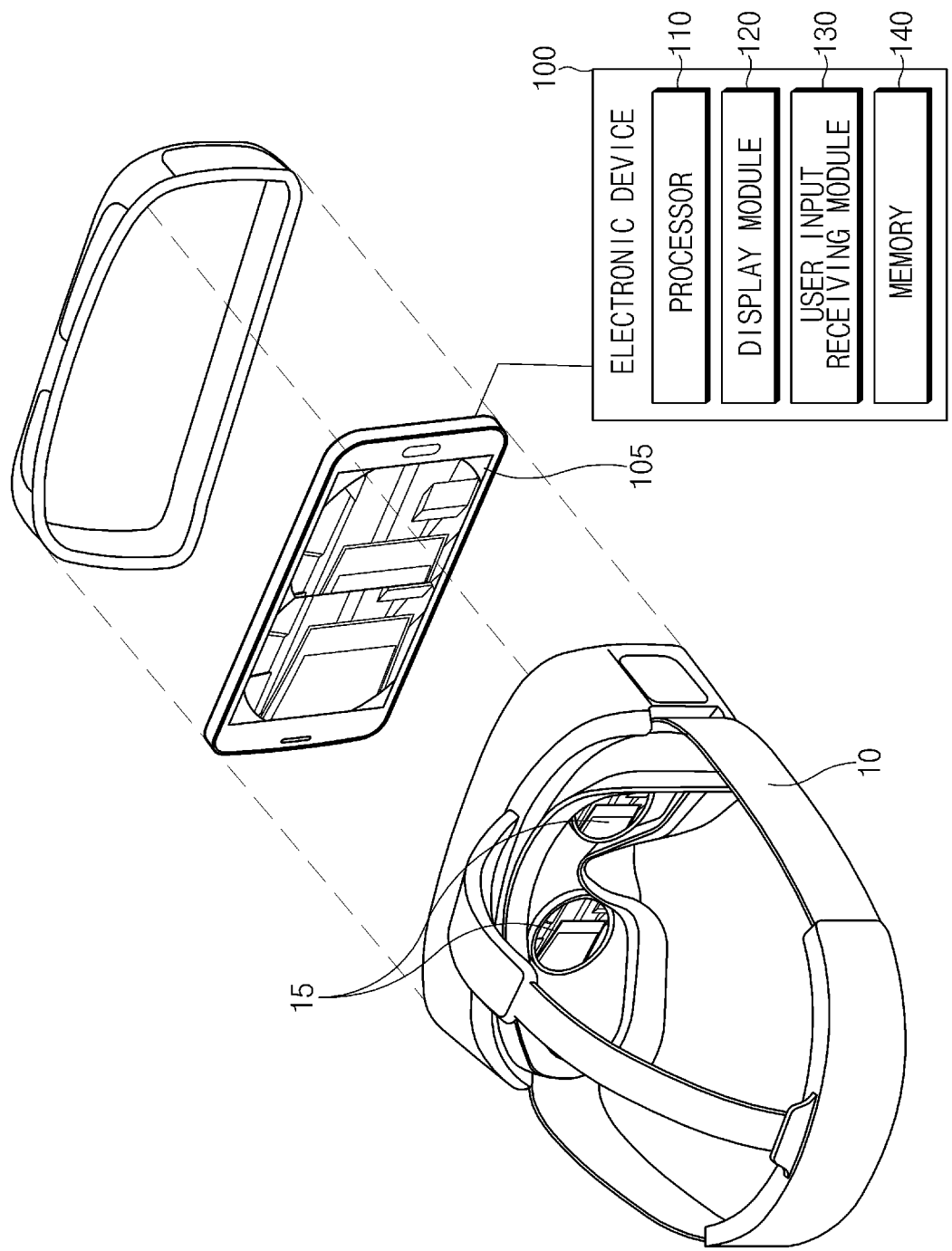
FIG. 1 is a diagram illustrating an external device, an electronic device, and a configuration of an electronic device, according to an embodiment of the present disclosure.

Various embodiments of the present disclosure are described with reference to accompanying drawings. Accordingly, those of ordinary skill in the art will recognize that modifications, changes, and/or alternative embodiments described herein can be variously made without departing from the scope and spirit of the present disclosure. With regard to description of drawings, similar components may be marked by similar reference numerals.

The expressions "have", "may have", "include" and "comprise", or "may include" and "may comprise" used herein indicate existence of corresponding features (e.g., elements such as numeric values, functions, operations, or components) but do not exclude the presence of additional features.

The expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specific embodiments of the present disclosure and are not intended to limit the scope of the present disclosure. The terms of a singular form may include plural forms unless otherwise specified. Unless otherwise defined herein, all the terms used herein, which include technical or scientific terms, may have the same meanings that are generally understood by a person skilled in the art. It will be further understood that terms, which are defined in a dictionary and commonly used, should also be interpreted as is customary in the relevant related art and not in an idealized or overly formal manner unless expressly so defined herein in various embodiments of the present disclosure. In some cases, even if terms are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), electronic apparel, electronic bracelets, electronic necklaces, electronic appcessories, electronic tattoos, smart mirrors, smart bands, smart watches, and the like.

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), points of sales (POS devices), or Internet of Things (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices may be one or more combinations of the above-mentioned devices, and an electronic device may be a flexible electronic device. Also, electronic devices according to the present disclosure are not limited to the above-mentioned devices, and may include new electronic devices according to the development of new technology.

Hereinafter, electronic devices according to an embodiment of the present disclosure will be described with reference to the accompanying drawings. The term "user" used herein may refer to a person who uses an electronic device or may refer to a device.(e.g., an artificial intelligence electronic device) that uses an electronic device.

FIG. 1 is a diagram schematically illustrating an external device 10, an electronic device 100, and a configuration of the electronic device 100, according to an embodiment of the present disclosure. As shown in FIG. 1, an electronic device 100 may be connected with an external device 10. However, the meaning of "the connection" may not be limited to the meaning of physical connection. For example, the electronic device 100 may be connected to the external device 10 through wireless communication, and thus the electronic device 100 may be used together with the external device 10 without any physical connection.

Referring to FIG. 1, the electronic device 100 includes a processor 110, a display module 120, a user input receiving module 130, and a memory 140.

The processor 110 may include one or more of a central processing unit (CPU), an application processor (AP), or a communication processor (CP). For example, the processor 110 may perform arithmetic operations or data processing associated with control and/or communication of at least other components.

According to an embodiment of the present disclosure, the processor 110 may implement an execution screen area which includes at least one object. Also, the processor 110 may determine at least a part of the execution screen area as a display area. The display area may be an area, which is to be shown to a user, among the execution screen area. The processor 110 may generate a screen corresponding to the display area to allow the determined display area to be shown to the user through the displays 15 of the external device 10. The processor 110 may display the screen corresponding to the display area on a display 105 through the display module 120.

The implemented execution screen area may include at least one object. The object may include, for example, at least one of image contents, video contents, an application execution screen, or a notification which informs the user of an event arising from the application.

The processor 110 may determine a location of the at least one object based on a direction to which the electronic device 100 faces and an attribute of the at least one object. The attribute of the object may include, for example, at least one of the types of object (e.g., an image, a video, an application execution screen, a notification, and the like), an object size, the number of objects, or an object arrangement method.

According to an embodiment of the present disclosure, the user input receiving module 130 may detect an operation inputted from the user. For example, the user input receiving module 130 may receive a user input such as the direction, to which the electronic device 100 faces, or a change in the direction.

The user input receiving module 130 may detect the direction, to which the electronic device 100 faces, or the change in the direction through at least one or more sensors included in the electronic device 100. For example, the sensors may include at least one or more of a gyro sensor, a magnetic sensor, and an acceleration sensor.

The processor 110 may change the display area of the execution screen area using the user input received through the user input receiving module 130, for example, user input indicating a change in the direction to which the electronic device 100 faces.

According to an embodiment of the present disclosure, the memory 140 may store data. The data stored in the memory 140 may include data exchanged between components of the electronic device 100 and data exchanged between the electronic device 100 and components outside the electronic device 100. For example, the memory 140 may store the execution screen area implemented by the processor 110 so as to correspond to the direction to which the electronic device 100 faces. Therefore, the processor 110 may determine the display area suitable for the direction, to which the electronic device 100 faces, based on information stored in the memory 140.

The memory 140 may include, for example, a hard disk drive (HDD), a solid state drive (SSD), a read only memory (ROM), a random access memory (RAM), a flash memory, and a memory card which are located inside or outside the electronic device 100.

In the above description, the processor 110 implements the execution screen area in advance and the display area is determined within the execution screen area. However, according to an embodiment of the present disclosure, the processor 110 may implement the execution screen area in real time as much as needed, based on the user input received through the user input receiving module 130, for example, user input indicating a change in the direction to which the electronic device 100 faces.

A person skilled in the art will easily understand that the processor 110, the display module 120, the user input receiving module 130, and the memory 140 may be implemented independently of each other or two or more thereof may be integrated.

Figure 2A:
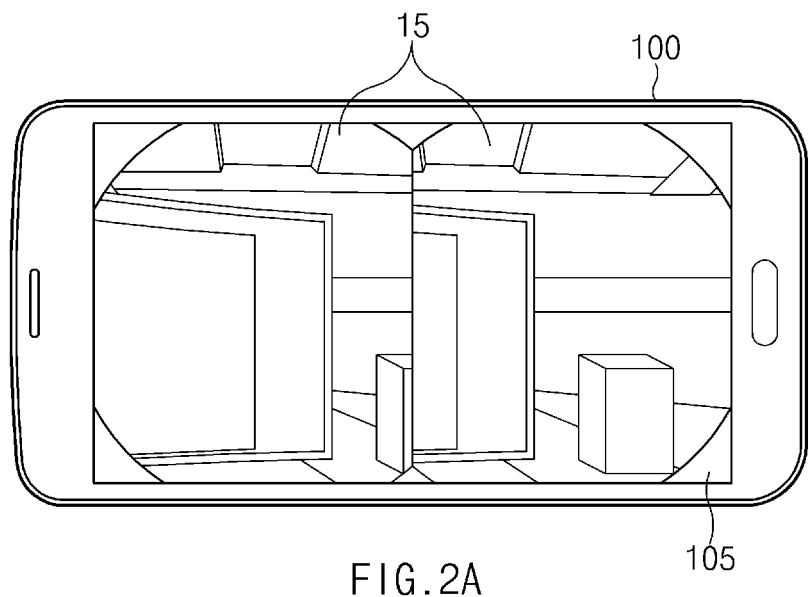
FIGS. 2A and 2B are diagrams schematically illustrating a screen displayed on the display of the electronic device, and a display area seen to a user, according to an embodiment of the present disclosure.
Figure 2B:
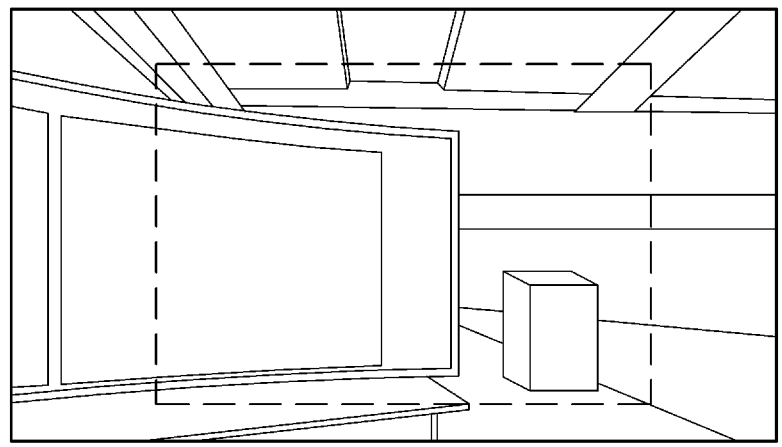

FIGS. 2A and 2B are diagrams schematically illustrating a screen displayed on the display 105 of the electronic device 100, and a display area 210 seen to a user, according to an embodiment of the present disclosure.

As illustrated in FIG. 2A, the display 105 of the electronic device 100 may display a screen which is displayed on displays 15 of the external device 10. The external device 10 may include the displays 15 that are seen with user's left and right eyes, respectively. The user may see the display 105 of the electronic device 100 through the displays 15.

To give a stereoscopic perception to the user, the electronic device 100 may display a screen considering a difference between both eyes (i.e., the disparity) which correspond to left and right displays of the external device 10.

In FIG. 2B, at least a part of an execution screen area 200 which the user sees through a display of the external device 10, and a display area 210 seen to a user, are illustrated.

Figure 3:
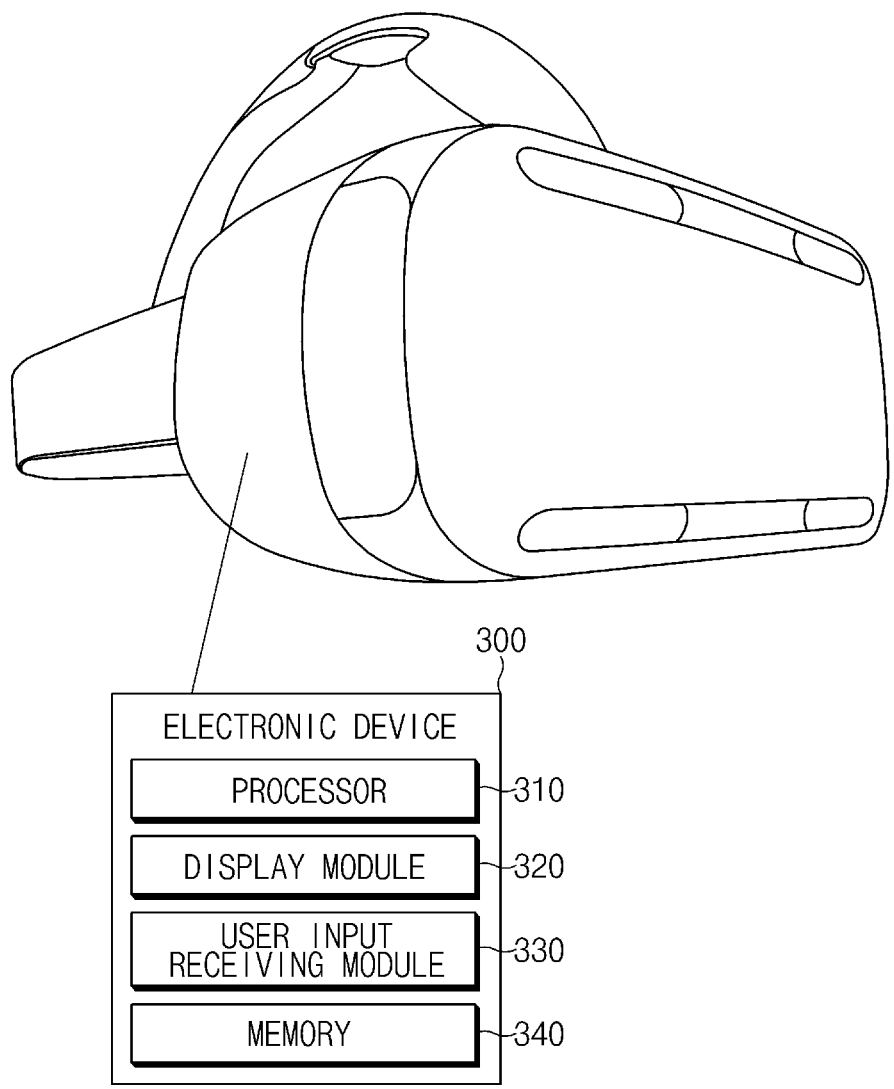
FIG. 3 is a diagram of an electronic device according to an embodiment of the present disclosure.

FIG. 3 is a diagram of an electronic device 300 according to an embodiment of the present disclosure. Referring to FIG. 1, the external device 10 and the electronic device 100 are separate devices that perform various functions through the connection therebetween. In FIG. 3, an electronic device 300 is part of the external device, and includes a processor 310, a display module 320, a user input receiving module 330, and a memory 340, thereby performing various functions by itself.

The processor 310, the display module 320, the user input receiving module 330, and the memory 340 of the electronic device 300 correspond to the processor 110, the display module 120, the user input receiving module 130, and the memory 140 of the electronic device 100 shown in FIG. 1, respectively, and thus a description thereof is omitted.

Figure 4A:
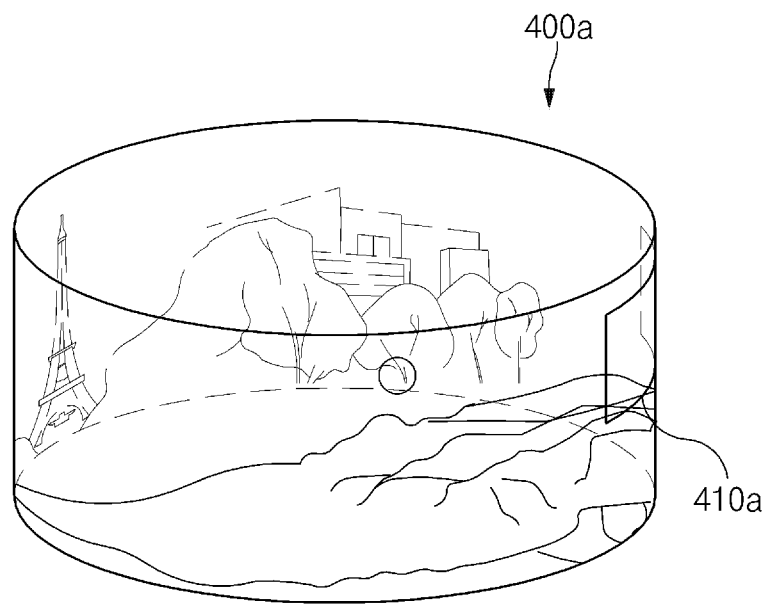
FIG. 4A is a diagram schematically illustrating a display area displayed through a display of an electronic device and an execution screen area as an area capable of being displayed, according to an embodiment of the present disclosure.

FIG. 4A is a diagram schematically illustrating a display area 410*a* displayed through the display 105 of the electronic device 100 and an execution screen area 400*a* as an area capable of being displayed, according to an embodiment of the present disclosure.

The processor 110 may implement an execution screen area 400*a*. The execution screen area 400*a* may be a virtual area which is capable of being displayed through the display 105 of the electronic device 100. A display area 410*a* included in the execution screen area 400*a* may be an area which is displayed directly on the display 105. However, the execution screen area 400*a* may not be limited to the shape of cylinder shown in FIG. 4. According to the present disclosure, the execution screen area 400*a* which is capable of being displayed through the display 105 may have the shape of sphere or semi-sphere.

According to embodiments of the present disclosure, the electronic device may be a wearable device which includes at least one of a head mounted display (HMD), a head mounted theater (HMT), and a head up display (HUD), or a device which is coupled with the wearable device. Even though not shown in FIG. 4A, the electronic device may be positioned at the center portion of the execution screen area 400*a* with the cylindrical shape and may face toward the display area 410*a*.

The processor 110 may determine an area to be displayed on the display 105 based on the direction to which the electronic device 100 faces. For example, when the direction to which the electronic device 100 faces is changed from the display area 410*a* to any other area due to head movement of the user wearing the electronic device 100, the processor 110 may display the other area on the display 105 through the display module 120.

The user input receiving module 130 may receive an input such as the change in the direction to which the electronic device 100 faces, using at least one or more sensors. Sensors that the user input receiving module 130 uses may include, for example, a gyro sensor, an acceleration sensor, and the like. In this case, the processor 110 may determine an area to be displayed on the display 105 within the execution screen area 400*a* based on the input received by the user input receiving module 130.

At least one object may be located within the execution screen area 400*a*. The object may include, for example, image contents, video contents, an application execution screen, and a notification which informs the user of an event arising from the application. In FIG. 4A, an embodiment of the present disclosure is shown as one landscape image displayed as an object within the execution screen area 400*a*. At this time, if the electronic device 100 receives an instant message (IM), a notification object may be additionally implemented in the execution screen area 400*a*, and thus a total of two objects may be located in execution screen area 400*a*. If the processor 110 executes an image/video viewer application, a plurality of thumbnail images may be located in the execution screen area 400*a* as a plurality of objects corresponding to the plurality of thumbnail images.

To facilitate understanding of the above description, a description about the execution screen area 400*a* will be given below using FIG. 4B.

Figure 4B:
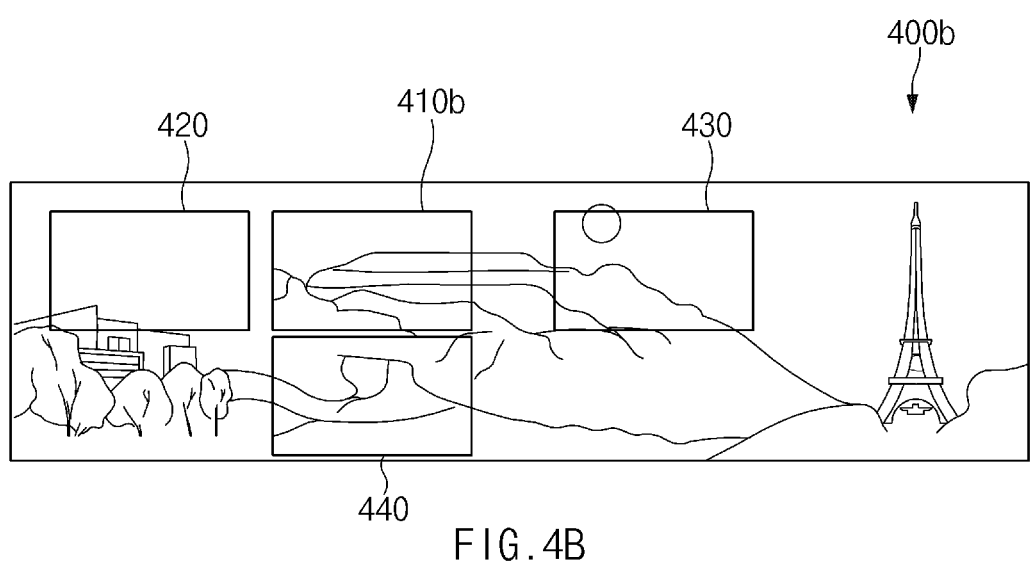
FIG. 4B is a diagram illustrating an unrolled appearance of an execution screen area shown in FIG. 4A, according to an embodiment of the present disclosure.

FIG. 4B is a diagram illustrating an unrolled appearance 400*b* of the execution screen area 400*a* shown in FIG. 4A, according to an embodiment of the present disclosure. The reference numerals 400*b* and 410*b* of FIG. 4B may correspond to the reference numerals 400*a* and 410*a* of FIG. 4A, respectively.

Referring to FIG. 4B, a display area 410*b* may be displayed on the display 105 of the electronic device 100 based on the direction to which the electronic device 100 faces. Also, if the direction to which the electronic device 100 faces is changed with the display area 410*b* displayed on the display 105, the area which is displayed on the display 105 may be changed from the display area 410*b* to an area corresponding to the changed direction. In this case, the processor 110 may apply, in real time, the direction to which the electronic device 100 faces, and thus an area displayed on the display 105 may be displayed while smoothly moving from the display area 410*b* to a corresponding area within the execution screen area 400*b*.

If the user turns his/her head to the left with the display area 410*b* displayed on the display 105, the display area 420 may be displayed on the display 105. Likewise, if the user turns his/her head to the right with the display area 410*b* displayed on the display 105, the display area 430 may be displayed on the display 105. Furthermore, if the user lowers his/her head down with the display area 410*b* displayed on the display 105, the display area 440 may be displayed on the display 105.

Figure 5A:
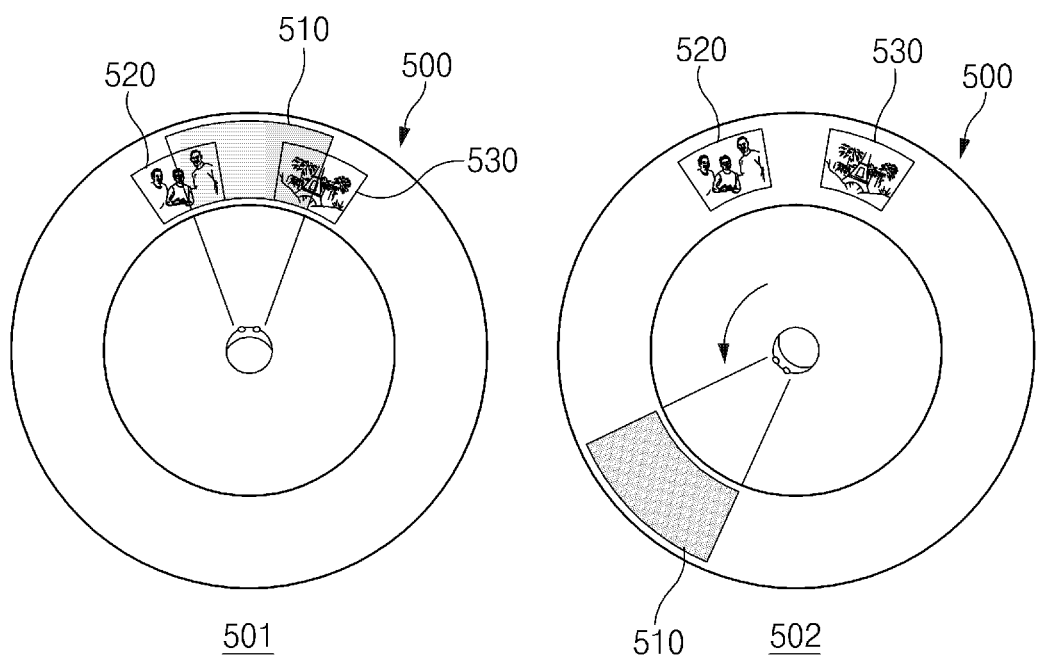
FIG. 5A and FIG. 5B are diagrams schematically illustrating the determination of locations of a first image object and a second image object based on a change in a direction to which an electronic device faces, according to an embodiment of the present disclosure.
Figure 5B:
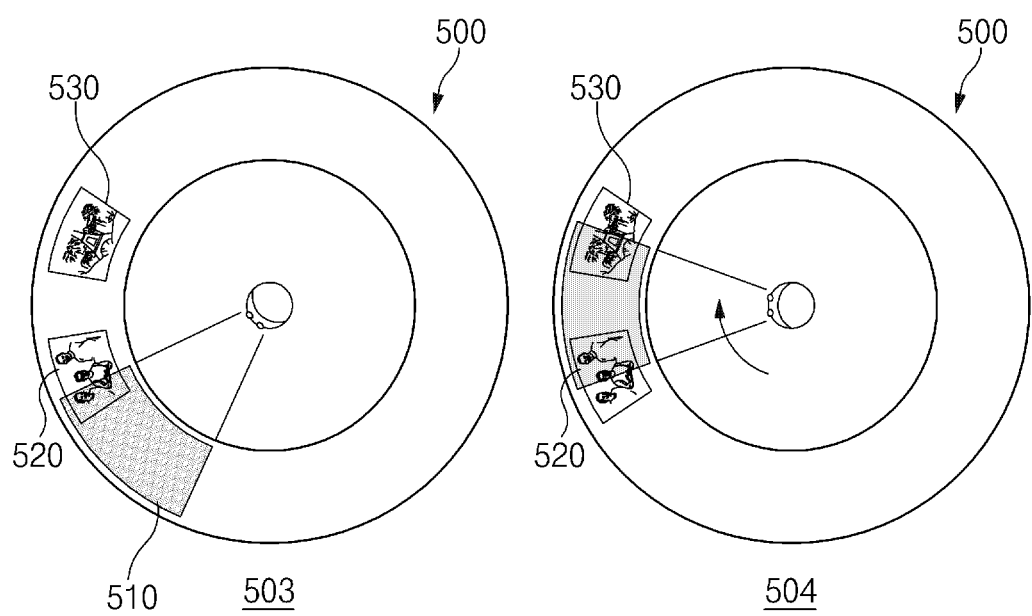

FIG. 5A and FIG. 5B are diagrams schematically illustrating the determination of locations of a first image object 520 and a second image object 530 based on the change in the direction to which the electronic device 100 faces, according to an embodiment of the present disclosure. FIG. 5A and FIG. 5B illustrate the appearance of the execution screen area 400*a* illustrated in FIG. 4A when viewed from the top. Determining of locations of a first image object 520 and a second image object 530 will be described with reference to operation 501 to operation 504.

Referring to operation 501 of FIG. 5A, an execution screen area 500 may include the first image object 520 and the second image object 530. In this case, the user input receiving module 130 may receive a direction to which the electronic device 100 faces, and the processor 110 may determine a display area 510, corresponding to the received direction to which the electronic device 100 faces, on the execution screen area 500. The display module 120 may display the determined display area 510 on the display 105.

In operation 502, the direction to which the electronic device 100 faces may be changed. In this case, the processor 110 may newly determine the display area 510 corresponding to the changed direction within the execution screen area 500 and may display the display area 510 newly determined on the display 105 through the display module 120.

However, in the case where the display area 510 is slightly away from the first image object 520 and the second image object 530, the user may change the direction to which the electronic device 100 faces, thereby making it difficult to find the first image object 520 and the second image object 530.

In operation 503 of FIG. 5B, the processor 110 may determine the locations of the first image object 520 and the second image object 530 as a location corresponding to the display area 510. For example, with respect to the first image object 520 included in an area which is not displayed on the display 105 of the execution screen area 500 in operation 502, in operation 503, the processor 110 may determine to display at least a part of the first image object 520 on the display 105. In this case, at least a part of the first image object 520 (included in the display area 510) displayed on the display 105 may be referred as an "anchor area".

In operation 504, if the direction to which the electronic device 100 faces is changed slightly to the right, the display module 120 may be capable of displaying the first image object 520 and/or the second image object 530 on the display 105.

If the direction to which the electronic device 100 faces in operation 502 is changed to the right from the display area 510 in operation 501, the display area 510 in operation 502 may be closer to the second image object 530. In this case, in operation 503, at least a part of the second image object 530 may be displayed on the display 105 instead of the first image object 520.

In the same manner, in the case where the direction to which the electronic device 100 faces is far away from an object, the processor 110 may again determine the location of the faraway object to allow the user to find the faraway object easily.

According to the present disclosure, even though the direction to which the electronic device 100 faces is far away from the object displayed on the display 105, if another object exists in the changed direction, the processor 110 may maintain the location of the faraway object without modification. For example, an image object and/or a video object may be included across the execution screen area 500 with an image/video viewer executed. In this case, even though the user changes the direction to which the electronic device 100 faces, another image or video may be displayed on the display 105, and thus the object, which is displayed on the display 105 before the change in the direction, need not continue to be displayed on the display 105.

Figure 6:
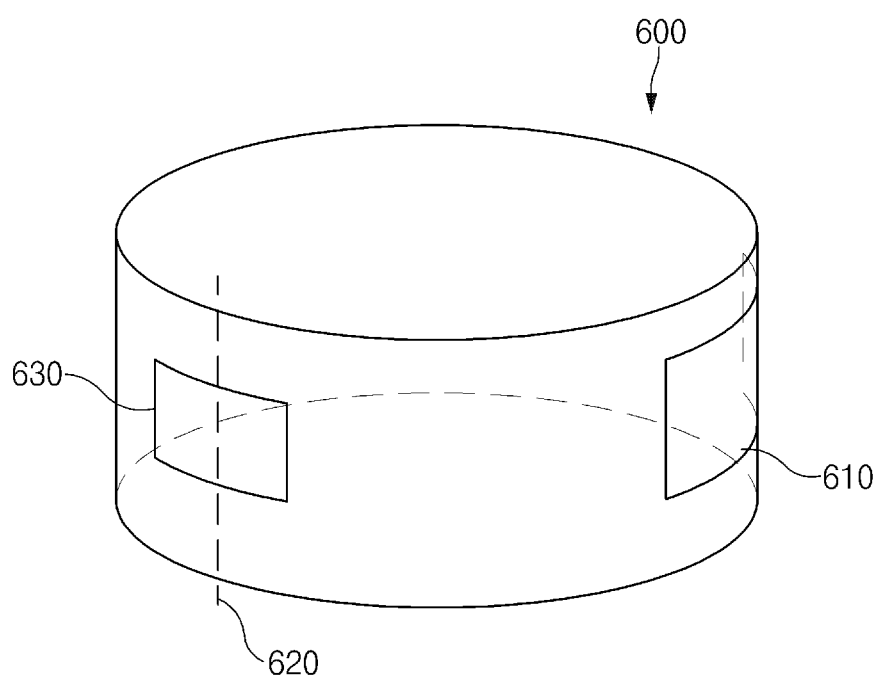
FIG. 6 is a diagram schematically illustrating a reference line for displaying an object newly generated, in an area which is capable of being displayed through a display of an electronic device, according to an embodiment of the present disclosure.

FIG. 6 is a diagram schematically illustrating a reference line 620 for displaying an object 630 newly generated, in an area which is capable of being displayed through the display 105 of the electronic device 100 according to an embodiment of the present disclosure.

The processor 110 may execute an application. The executed application or an object included in the executed application may be located on an execution screen area 600 with a specific reference. In an embodiment of FIG. 6, an object 630 may be located on a reference line 620.

In a state where the electronic device 100 faces a display area 610, the processor 110 may execute the application, and an object 630 included in the executed application may be located on the reference line 620. In this case, the object 630 may be spaced from the display area 610 by a distance, thereby making it difficult for the user to find the object 630. Hence, the processor 110 may locate an anchor area of the newly located object 630 on the display area 610 in addition to the case (e.g., operations illustrated in FIG. 5) in which the electronic device 100 faces an area which the object (e.g., the object 520 or the object 530 of FIG. 5) is located and then a direction of the electronic device 100 is changed to face another area which the object was not located.

The above-described operation may be applicable to the case in which the notification object, which informs the user of the arrival of an e-mail during the execution of any application, is located at the reference line 620, as well as the case in which a new application is being executed.

According to another embodiment of the present disclosure, the object 630 included in the executed application or the notification object may be displayed on the display area 610 from the beginning instead of being located on the reference line 620 (as described below). If a new application is executed, or if the notification object occurs, it may mean that the display area 610 becomes the reference line 620.

Below, an operation with reference to FIG. 6 will be described in more detail with reference to FIG. 7

Figure 7:
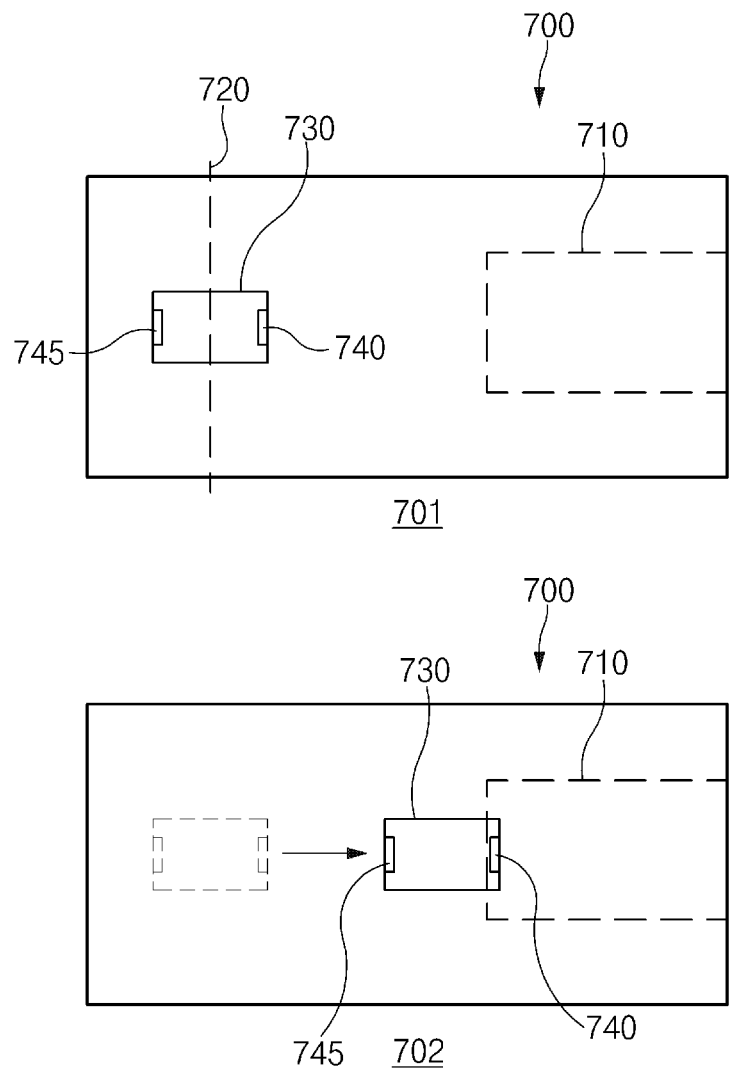
FIG. 7 is a diagram schematically illustrating an operation in which at least a part of an object not displayed on a display of an electronic device is displayed on a display, according to an embodiment of the present disclosure.

FIG. 7 is a diagram schematically illustrating an operation in which a first anchor area 740, which is at least a part of an object 730 not displayed on the display 105 of the electronic device 100, is displayed on the display 105, according to an embodiment of the present disclosure. At least a part of an execution screen area 700 may be shown in FIG. 7. The execution screen area 700 may include a display area 710, a reference line 720, and an object 730, and the object 730 may include a first anchor area 740 and a second anchor area 745.

In operation 701, the processor 110 may locate the object 730 on the reference line 720 based on an execution of any application or a notification event arising from any application. In this case, the object 730 may not be located on the display area 710 as illustrated in operation 701.

In such a situation, the user may have difficulty in determining the location of the object 730 and may not even know the fact that the object 730 is located somewhere within the execution screen area 700. Therefore, in operation 702, the processor 110 may locate the first anchor area 740, which is at least a part of the object 730, on the display area 710.

Alternatively, if the object 730 is located on the right hand side of the display area 710, in operation 702, the processor 110 may locate the second anchor area 745 on the display area 710.

According to another embodiment of the present disclosure, in operation 702, the whole object 730 may be located in the display area 710.

Figure 8:
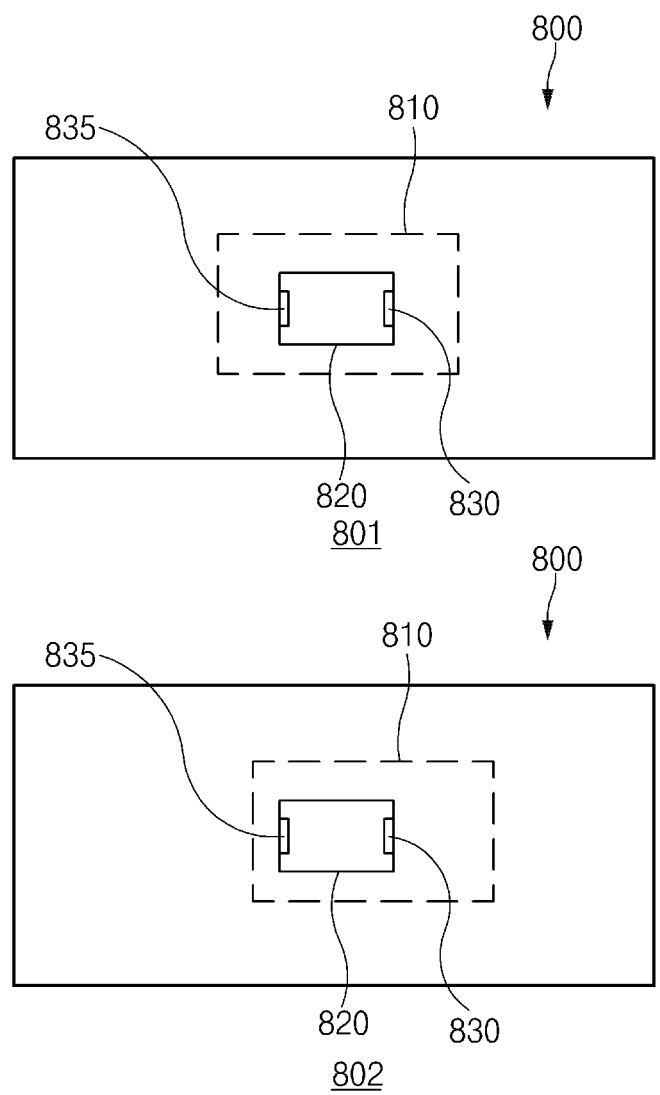
FIG. 8 is a diagram schematically illustrating a location of an object based on a change in a direction to which an electronic device faces, according to an embodiment of the present disclosure.

FIG. 8 is a diagram schematically illustrating a location of an object 820 based on a change in a direction to which an electronic device 100 faces, according to an embodiment of the present disclosure. At least a part of an execution screen area 800 is illustrated in FIG. 8. A display area 810 and an object 820 may be located in the execution screen area 800.

Referring to operation 801, the whole object 820 may be included within the display area 810. In operation 801, the user may be capable of locating the whole object 820 within the display area 810 by changing the direction to which the electronic device 100 faces. In contrast, as described above, the whole object 820 corresponding to an execution of any application or a notification event may be located in the display area 810 from the beginning.

With respect to operations 801 and 802, the location of the display area 810 may be changed within the execution screen area 800 but the location of the object 820 may not changed.

In operation 802, the direction to which the electronic device 100 faces may be changed based on turning of the user's head. In this case, it may be assumed that the degree of the change in the direction to which the electronic device 100 faces is limited such that the object 820 moves within a range included in the display area 810. Under the above assumption, the processor 110 may maintain the location of the object 820 within the execution screen area 800.

Figure 9:
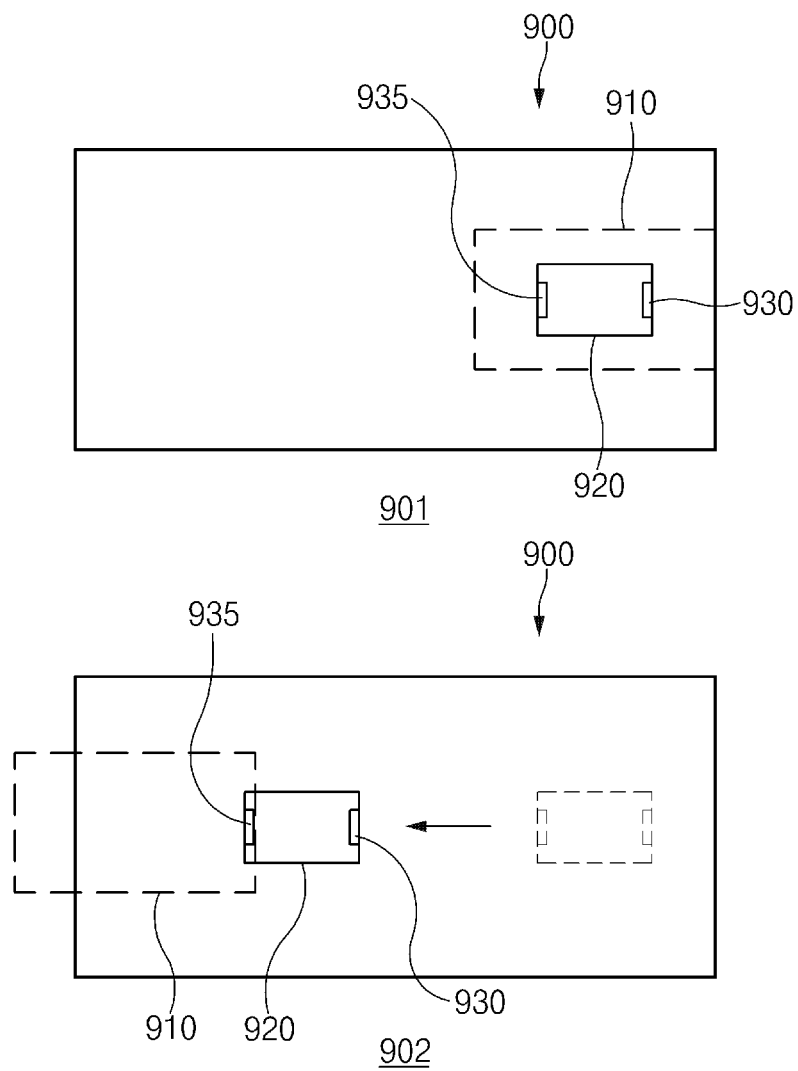
FIG. 9 is a diagram schematically illustrating a location change of an object due to a change in a direction to which an electronic device faces, according to an embodiment of the present disclosure.

FIG. 9 is a diagram schematically illustrating a location change of an object 920 due to a change in a direction to which the electronic device 100 faces, according to an embodiment of the present disclosure. At least a part of an execution screen area 900 is illustrated in FIG. 9. The execution screen area 900 may include a display area 910 and an object 920.

Unlike FIG. 8, in FIG. 9 the object 920 is out of a range included in the display area 910.

Operation 901 may correspond to operation 801, and a description thereof may be thus omitted.

In operation 902, the display area 910 may be out of a location of the object 920 illustrated in operation 901. In this case, a second anchor area 935 of the object 920 may move together with a movement of the display area 910. The second anchor area 935 may appear to be moving with the second anchor area 935 hooked to the right side of the display area 910. Even though not shown in FIG. 9, during the progress from operation 901 to operation 902, the second anchor area 935 of the object 920 may move together with the movement of the display area 910 as soon as the right side of the display area 910 touches the right side of the second anchor area 935. In other words, the processor 110 may maintain the location of the object 920 or the second anchor area 935 on the display area 910 from this point in time.

Operations illustrated in FIG. 8 may be executed between operation 901 and operation 902 in FIG. 9.

If the display area 910 moves in the right direction in operation 902, a first anchor area 930 of the object 920 may move together with the display area 910.

According to another embodiment of the present disclosure, when the display area 910 moves left, the first anchor area 930 of the object 920 may move together with the display area 910. Also, when the display area 910 moves right, the second anchor area 935 of the object 920 may move together with the display area 910

Figure 10:
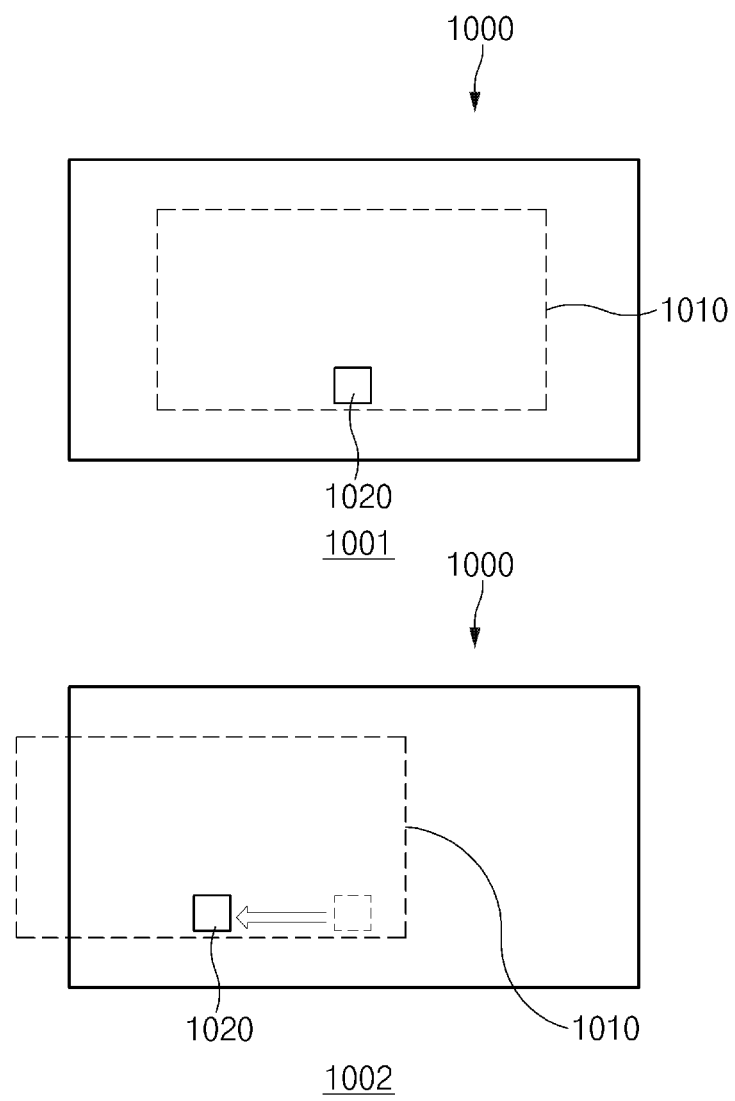
FIG. 10 is a diagram schematically illustrating a location of an object based on a change in a direction to which an electronic device faces, according to an embodiment of the present disclosure.

FIG. 10 is a diagram schematically illustrating a location of an object 1020 based on a change in the direction to which the electronic device 100 faces, according to an embodiment of the present disclosure.

In operation 1001, the processor 110 may locate an object 1020 on an area within a display area 1010.

In operation 1002, when the display area 1010 moves left, the object 1020 may move together with the display area 1010. In this case, the processor 110 may maintain the location of the object 1020 on the display area 1010.

Referring to FIGS. 9 and 10, after a point in time when the first anchor area 930 or the second anchor area 935 of the object 920 in FIG. 9 is located on a boundary of the display area 910, the processor 110 may maintain the location of the object 920 on the display area 910. In the case of FIG. 10, the processor 110 may maintain a location where the object 1020 is first displayed within the display area 1010, unlike the operations of FIG. 9.

Figure 11:
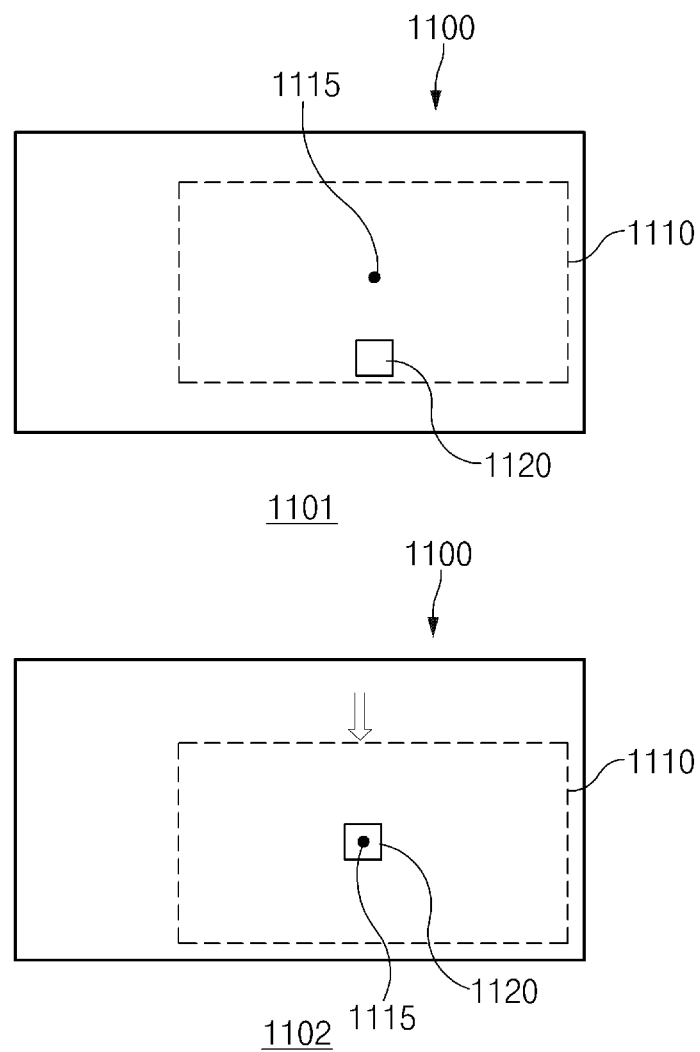
FIG. 11 is a diagram schematically illustrating an object and a pointer displayed on a display of an electronic device, according to an embodiment of the present disclosure.

FIG. 11 is a diagram schematically illustrating an object 1120 and a pointer 1115 displayed on the display 105 of the electronic device 100, according to an embodiment of the present disclosure.

In operation 1101, the processor 110 may allow a pointer 1115 to be displayed on an area of a display area 1110. The location of the pointer 1115 within the display area 1110 may not be changed.

In operation 1102, the user may change the direction to which the electronic device 100 faces, by lowering his/her head. If so, the display area 1110 may move downwardly, and the pointer 1115 may be located on the object 1120. When the location of the pointer 1115 corresponds to the location of the object 1120, the processor 110 may perform an operation which is stored in the memory 140 with respect to the object 1120. If the object 1120 is a notification object, the processor 110 may display event information corresponding to the notification object. Also, if the object 1120 is an image object or a video object, the processor 110 may enlarge and display the image object or the video object.

According to another embodiment of the present disclosure, the pointer 1115 may not be displayed in operation 1101 but may be displayed in operation 1102.

Figure 12:
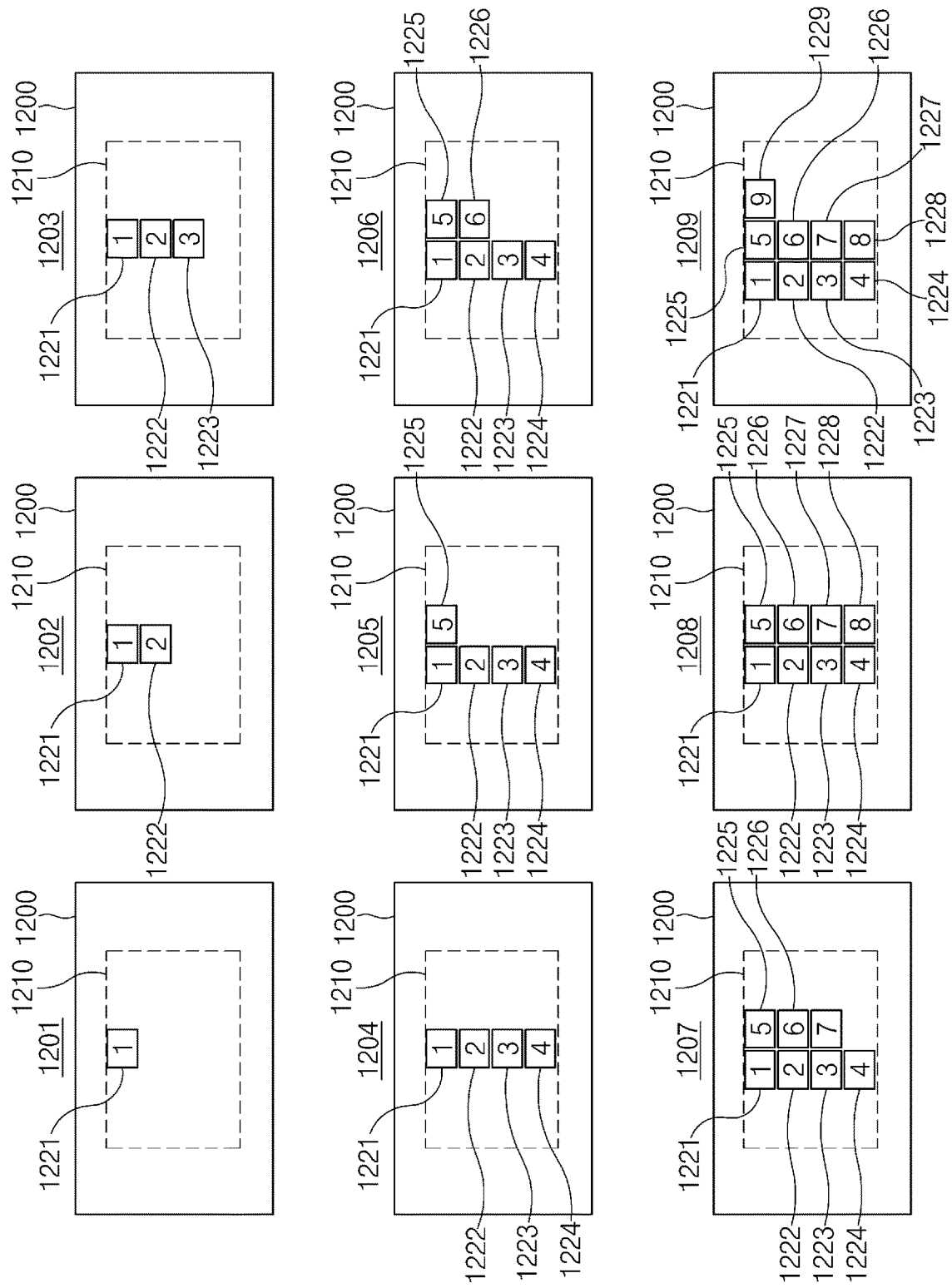
FIG. 12 is a diagram schematically illustrating arrangement of a plurality of objects displayed on a display of an electronic device, according to an embodiment of the present disclosure.

FIG. 12 is a diagram schematically illustrating arrangement of a plurality of objects 1221 to 1229 displayed on the display 105 of the electronic device 100, according to an embodiment of the present disclosure.

Operation 1201 to operation 1209 may be independent of each other. For example, Operation 1201 illustrates that one object is displayed on a display area 1210. Operation 1201 may correspond to operation 1001 of FIG. 10.

Operation 1202 may correspond to an operation which is executed when the number of objects is 2, operation 1203 may correspond to an operation which is executed when the number of objects is 3, and operation 1204 to operation 1209 may correspond to operations executed according to the respective number of objects.

As understood from operation 1201 to operation 1209, a plurality of the objects may be arranged within a display area 1210 in a vertical direction based on the top center of the display 1210. If the object is located on the reference line as illustrated in FIG. 6, the user may have difficulty in finding the object. If the number of objects is not sufficiently great, the user may have difficulty in finding the object more and more. Therefore, the processor 110 may arrange a plurality of the objects within the display area 1210.

If the number of objects each having a size illustrated in FIG. 12 is great enough to fully fill the display area 1210, an object which is not displayed within the display area 1210 may be located on an are, which is outside of the display area 1210, of the execution screen area 1200.

However, arranging of a plurality of objects may not be limited to the above description. For example, the processor 110 may arrange objects within the display area 1210 to a right direction, based on the top left of the display area 1210.

According to the present disclosure, an electronic device may include a processor for implementing an execution screen area including at least one object; and a display module for displaying at least a part of the implemented execution screen area on a display of the electronic device. The processor may determine a location of the at least one object based on a direction to which the electronic device faces and an attribute of the at least one object.

According to the present disclosure, at least a part of the execution screen area displayed on the display may be changed based on the direction to which the electronic device faces.

According to the present disclosure, the attribute of the object may include at least one of a kind of the object, a size of the object, the number of the object, and a method of arranging the object.

According to the present disclosure, the object may include at least one of image contents, video contents, an application execution screen, or a notification which informs an event arising from an application.

According to the present disclosure, the processor may determine a location of the first object based on a change in the direction to which the electronic device faces, with an anchor area of the first object displayed on the display area.

According to the present disclosure, if the direction to which the electronic device faces is changed in a direction opposite to the anchor area displayed on the display area, the processor may maintain a location of the anchor area displayed on the display.

According to the present disclosure, if the direction to which the electronic device faces is changed to a direction of the anchor area displayed on the display area, the processor may allow an area wider than the anchor area of the first object to be displayed on the display.

According to the present disclosure, if a display area corresponding to a second direction of the electronic device is located within an area included the second object, the processor may maintain the location of the second object within the execution screen area.

According to the present disclosure, if a display area corresponding to a second direction of the electronic device is outside an area including the second object, the processor may display at least a part of the second object on the display corresponding to the second direction.

According to the present disclosure, the processor may maintain a location of a generated object which is displayed on the display area, based on a change in the direction to which the electronic device faces.

According to the present disclosure, the display module may locate a pointer within the display area, and the processor may perform an operation stored in the memory with respect to the object when a location of the pointer corresponds to a location of an object.

According to the present disclosure, if the newly generated object is in a plurality of objects, the plurality of objects may be arranged within the display area.

According to the present disclosure, the electronic device may further include a user input receiving module for receiving an input about a change in the direction to which the electronic device faces, using at least one or more sensors. In this case, the processor may determine an area to be displayed on the display within the execution screen area based on the input.

According to the present disclosure, a method may include implementing an execution screen area which includes at least one object, displaying at least a part of the implemented execution screen area on a display of the electronic device, and determining a location of the at least one object based on a direction to which the electronic device faces and an attribute of the at least one object.

According to the present disclosure, the method may include receiving an input about a change in the direction to which the electronic device faces, using at least one or more sensors, determining an area to be displayed on the display within the execution screen area based on the received input, and displaying the determined area on the display.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to embodiments of the present disclosure may be, for example, implemented by instructions stored in a computer-readable storage media in the form of a program module. The instruction, when executed by one or more processors (e.g., a processor 110), may cause the one or more processors to perform a function corresponding to the instruction. The computer-readable storage media, for example, may be the memory 140.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to embodiments of the present disclosure may include at least one of the above elements, or a portion of the above elements may be omitted, or additional other elements may be further included. Operations performed by a module, a program module, or other elements according to an embodiment of the present disclosure may be executed sequentially, in parallel, repeatedly, or in a heuristic method. Also, a portion of operations may be executed in different sequences, omitted, or other operations may be added.

The electronic device and the method according to the present disclosure may determine a location of an object at least based on a direction to which the electronic device faces such that a user easily finds an object not located in a direction where the user is looking at.

Further, the electronic device and the method according to the present disclosure may arrange a plurality of objects in an area to be displayed on the display of the electronic device, thereby allowing the user to easily find the object.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display; and
   a processor configured to:
      implement an execution screen area which is larger than a size of the display,
      display, on the display, a first display area which is a first part of the implemented execution screen area based on a direction to which the electronic device faces, the first display area including a first object, the first object including an anchor area and a remaining area such that the anchor area and the remaining area are displayed in the first display area,
      display, on the display, a second display area, which is a second part of the implemented execution screen area, based on a change in the direction to which the electronic device faces, and
      attach the anchor area of the first object to an edge of the second display area when at least a portion of the remaining area of the first object is located outside of the second display area due to the change in the direction to which the electronic device faces such that the first object including the anchor area and the remaining area moves together with the second display area and the anchor area is maintained on the second display area during movement of the second display area.

2. The electronic device of claim 1, wherein an attribute of the first object comprises at least one of a type of the first object, a size of the first object, the number of the first object, and a method of arranging the first object.

3. The electronic device of claim 1, wherein a type of the first object comprises at least one of image contents, video contents, an application execution screen, or a notification which informs a user of an event arising from the application.

4. The electronic device of claim 1, wherein the processor is further configured to:
   display, on the first display area, a second object, and
   display, on the second display area, the second object based on the change in the direction to which the electronic device faces.

5. The electronic device of claim 4, wherein the processor is further configured to, if the second object is included in the second display area, maintains a location of the second object within the execution screen area.

6. The electronic device of claim 4, wherein the processor is further configured to, if the second object is not included in the second display area, change a location of the second object within the execution screen area for a part of the second object to be displayed on the second display area.

7. The electronic device of claim 1, wherein the processor is further configured to, display, on the first display area, a third object which is newly generated based on an operation of the electronic device.

8. The electronic device of claim 7, wherein the processor is further configured to maintain a location on the display, on which the third object is displayed on the second display area, based on the change in the direction to which the electronic device faces.

9. The electronic device of claim 1, wherein the processor is further configured to display a pointer on the display, and
perform an operation stored in a memory with respect to the first object when a location of the pointer corresponds to a location of the first object in response to the change in the direction to which the electronic device faces.

10. The electronic device of claim 7, wherein if the third object is in a plurality of objects, the plurality of the objects are arranged within the first display area.

11. The electronic device of claim 1, wherein the electronic device is a wearable device which comprises at least one of a head mounted display (HMD), a head mounted theater (HMT), and a head up display (HUD), or a device which is coupled with the wearable device.

12. The electronic device of claim 1, further comprising:
a user input receiving module configured to receive an input about the change in the direction to which the electronic device faces, using at least one sensor,
wherein the processor is further configured to determine the second display area within the execution screen area based on the input.

13. A method performed on an electronic device, the method comprising:
implementing, using a processor, an execution screen area which is larger than a size of a display of the electronic device,
displaying, using the processor, on the display, a first display area which is a first part of the implemented execution screen area based on a direction to which the electronic device faces, the first display area including a first object, the first object including an anchor area and a remaining area such that the anchor area and the remaining area are displayed in the first display area,
displaying, using a processor, on the display, a second display area, which is a second part of the implemented execution screen area, based on a change in the direction to which the electronic device faces, and
attaching the anchor area of the first object to an edge of the second display area when at least a portion of the remaining area of the first object is located outside of the second display area due to the change in direction to which the electronic device faces such that the first object including the anchor area and the remaining area moves together with the second display area and the anchor area is maintained on the second display area during movement of the second display area.

14. The method of claim 13, wherein the first display comprises a plurality of objects which are newly generated based on an operation of the electronic device, and further comprising:
arranging the plurality of objects within the first display area.

15. The method of claim 13, wherein displaying the second display area comprises:
receiving an input about the change in the direction to which the electronic device faces, using at least one sensor;
determining the second display area within the execution screen area based on the received input; and
displaying the second display area on the display.

16. An electronic device comprising:
a display;
at least one sensor configured to detect a direction the electronic device faces;
a processor configured to:
implement an execution screen area which is larger than a size of the display, the execution screen area including at least a virtual object with an anchor area and a remaining area;
detect a first direction the electronic device faces using the at least one sensor;
determine, based on the first direction, a first display area which is a part of the implemented execution screen area to be displayed on the display; and
determine a location of the virtual object such that the anchor area of the virtual object is attached to an edge of the first display area when at least a portion of the remaining area of the virtual object is outside the first display area due to movement of the first display area within the execution screen area such that the virtual object including the anchor area and the remaining area moves together with the first display area.

* * * * *